Jan. 20, 1931.                W. C. KRESS                1,789,553
                            CHAIN PIPE TONGS
                          Filed April 10, 1929
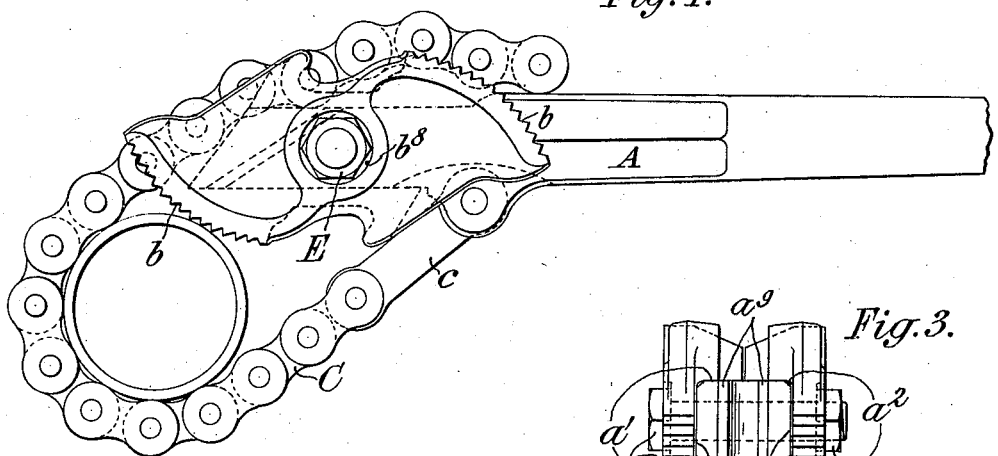
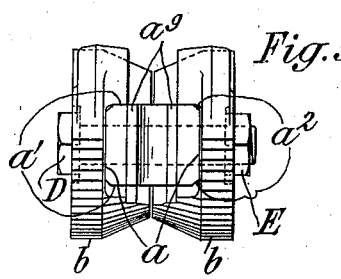
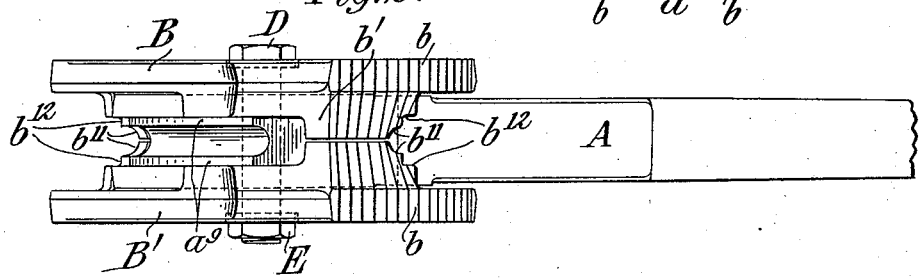
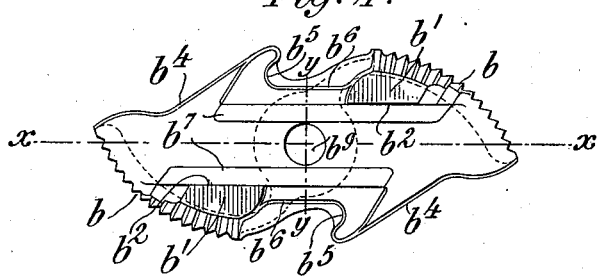
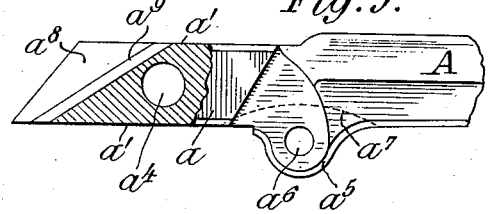
INVENTOR:
Willard C. Kress,
By Attorneys,
Fraser, Myers & Manley.

Patented Jan. 20, 1931

1,789,553

UNITED STATES PATENT OFFICE

WILLARD C. KRESS, OF KENMORE, NEW YORK, ASSIGNOR TO J. H. WILLIAMS & CO., OF BUFFALO, NEW YORK, A CORPORATION OF NEW YORK

CHAIN PIPE TONGS

Application filed April 10, 1929. Serial No. 353,916.

The present invention relates to chain pipe tongs adapted for service on pipes, pipe fittings, flanges and the like, and aims to provide certain improvements therein.

The objects of the present invention are to generally improve the construction and reduce the cost of manufacture of chain pipe tongs provided with a curved working face having a bifurcated gripping portion at the end of the jaw and a continuous gripping portion rearwardly of said end.

According to the present invention I provide a chain pipe tongs of the character described, having reversible jaw elements, each formed with two complete and independent sets of gripping surfaces and chain anchorages adapted to accommodate either a flat link chain or a cable chain, said jaw elements being so shaped and co-related to the handle as to provide easy hooking-in or engagement of the chain and provide a perfect natural clearance where the swinging link of the chain passes between the jaw elements.

The invention also embodies other advantages which result from its novel construction, all of which will become apparent from the detailed description which follows:

A preferred embodiment of my invention is illustrated in the accompanying drawings, wherein, Figure 1 is a side elevation of a chain pipe tongs embodying my invention, showing the chain in gripping relation on a pipe.

Fig. 2 is a top plan view of the chain pipe tongs shown in Fig. 1.

Fig. 3 is an end elevation of the chain pipe tongs shown in Figs. 1 and 2.

Fig. 4 is a side elevation of the inner face of one of the jaw elements.

Fig. 5 is an elevation partly in section, of the end portion of the chain pipe tongs handle.

Referring to the drawings, the chain pipe tongs illustrated therein comprise the following component parts: The handle A, a pair of jaw elements B, B', a chain C, and the bolt D and nut E for securing the jaw elements to the handle.

The handle A may be of any desired length and contour and is formed at its jaw elements engaging end of substantially rectangular cross-section having opposite flat parallel sides $a$, $a$, and flat top and bottom $a'$, $a'$. The edges at the intersections of the flat sides with the top and bottom are preferably chamfered, as best shown at $a^2$ in Fig. 3. The handle rearwardly from its end has a hole $a^4$ passing therethrough substantially centrally of the flat sides, for accommodating the bolt D and rearwardly of said hole it is formed with a depending bifurcated lug $a^5$ having a hole $a^6$ passing therethrough, in which lug the end link $c$ of the chain C is fixedly secured. The inner faces of the bifurcated lug $a^5$ are preferably machined, as shown at $a^7$, to provide for easy working therein of the terminal link $c$ of the chain.

The jaw elements B, B' are alike excepting that one is designed for engagement against the right hand face $a$ of the handle, and the other against the left hand face. Aside from this distinction each jaw element consists of an elongated steel plate, preferably a drop forging, having curved serrated or toothed working faces $b$, $b$, extending from the ends of the plate rearwardly approximately two-fifths the length of the plate, and disposed in inverse symmetrical or diametrical relation to each other with respect to the longitudinal center line of the plate. Inwardly of its ends at its curved working faces, the jaw elements are formed with integral, inwardly-extending projections $b'$ of a width such that when a pair of complemental jaw elements are mounted on the handle A, the projections $b'$ will be in substantially abutting relation. These projections preferably have their top surfaces tapering inwardly and serrated, forming a V-shaped slot or crotched recess and thus constitute rearward and inward continuations of the serrated curved surfaces $b$. The inner faces $b^2$ of the projections $b'$ are preferably flat for cooperative engagement with the top and bottom flat faces $a'$ of the handle. The faces $b^4$ opposite to the working faces of the jaw elements are preferably plain and free from inwardly-extending projections, so as to provide the necessary clearance for the chain. At points approximately coincident with the center of curvature of the working faces, the jaw elements are formed with internal recesses $b^5$ for engaging the pintles of a flat link chain, or the links of a cable chain, to provide anchorages therefor after said chain has been positioned around the work. Between the recesses $b^5$ and the rear end of the curved working faces, the plates are formed with a recess $b^6$ which provides additional clearance for the chain. The inner faces of the jaw elements B and B' are preferably machined, as shown at $b^7$, for engagement with the sides $a'$ of the handle, and are machined on their outer side as shown at $b^8$, to provide a seating for the head of the bolt D and face of the nut E. To accommodate said bolt, the jaw elements are provided with central openings $b^9$. It will be noted that the jaw elements are inversely symmetrical with respect to both the center lines $x$—$x$ and $y$—$y$ passing through the center of opening $b^9$, hence it will be apparent that said element is reversible to bring either of the gripping surfaces into active position.

To provide a suitable clearance for the chain after engagement around the pipe or fitting to be gripped, the end of the handle A is grooved, as shown at $a^8$, the bottom of said groove being substantially semi-circular in cross-section to accommodate cable chain, and the side walls of said groove having intermediate shoulders $a^9$ for accommodating flat link chain. To further insure proper clearance and accommodation for both types of chain, the outer end face of the projections $b'$ are shaped to cooperate with the grooves in the end of the handle, as best shown by the reference characters $b^{11}$ and $b^{12}$ in Fig. 2.

The chain pipe tongs as thus described, in manner of use, does not differ from chain pipe tongs heretofore employed. It will be apparent, however, in view of the specific form of the jaw elements and its cooperative relation with the handle, that the chain pipe tongs of the present invention are equally well adapted for efficient use with either a flat link chain, or a cable chain, on both pipe and pipe fittings; and further, that when the teeth or serrations in one of the working faces of a jaw element become worn and inefficient, the second gripping surface thereof can be readily brought into use. It will be apparent also that by forming the gripping surfaces on separate jaw elements, the cost of the machining operations in forming the V-shaped slot, or crotch-like recess inwardly of the gripping faces, is kept at a minimum, thereby aiding in economical production of the device as a whole. It will also be noted that, although the substantially continuous portion of the gripping faces bearing the V-shaped slot, or crotch-like recess, of the jaw elements might, with other arrangement of the elements, tend strongly to obstruct the proper operation of the chain, the present invention provides both for easy hooking-in of the chain and for natural clearance of the swinging link thereof.

While I have shown and described a preferred embodiment of my invention, it is to be understood that I do not wish to be limited to the specific form of device illustrated, but that modifications thereof may be resorted to without departing from the spirit of the invention.

What I claim is:

1. A chain pipe tongs comprising a handle, a chain, a pair of reversible jaw elements carried by said handle and provided with curved gripping faces which elements when in assembled relation on the handle provide a gripping jaw with a bifurcated portion extending inwardly from the end a substantial distance and a practically continuous transverse portion inwardly of said bifurcated portion, and means for securing said jaw elements to the handle whereby they are reversible on said handle.

2. A chain pipe tongs comprising a handle, a chain, a pair of reversible jaw elements carried by said handle and provided with at least two complete sets of curved gripping faces which are laterally spaced apart for a substantial distance inwardly from the ends of the jaw and in substantially abutting relation inwardly of said laterally spaced apart faces, said parts in abutting relation converging toward each other to provide a crotch-like recess, the faces of the jaw elements opposite to the gripping faces being free from projections to provide a clearance for the chain above the active gripping faces, and means for securing said jaw elements to the handle whereby they are reversible on said handle.

3. A chain pipe tongs comprising a handle and a pair of reversible jaw elements carried by said handle and secured thereto by a single bolt, said jaw elements being disposed on opposite sides of the handle near one end thereof and having convex gripping surfaces at the bottom of their forward ends and at the top of their rearward ends, said gripping faces being disposed in inverse symmetrical or diametrical relation to each other with their gripping faces laterally spaced apart at the ends of the jaw and in substantially laterally-abutting relation inwardly of said ends whereat the gripping faces converge toward each other to provide a crotch-like recess, and a chain pivotally secured at one end to the handle rearwardly of the fastening bolt, said jaw elements being reversible on the handle upon loosening the securing bolt.

4. A chain pipe tongs comprising a handle and a pair of reversible jaw elements carried by said handle, said jaw elements being disposed on opposite sides of the handle near one end thereof and fastened thereto by a single bolt, said jaw elements having two sets of convex gripping surfaces, one at the bottom forward end and the other at the top rear end, said gripping surfaces being disposed in inverse symmetrical or diametrical relation to each other with their gripping surfaces laterally spaced apart at the ends of the jaw and in laterally, substantially abutting relation inwardly of said ends, a chain pivotally secured to said handle rearwardly from the fastening bolt passing therethrough, anchoring means on said jaw elements for engaging the chain intermediate its ends, the end of the handle between the jaws being grooved and the faces on the jaw elements opposite to the working faces being plain and free from projections to provide clearance for the chain above the active gripping surface.

In witness whereof, I have hereunto signed my name.

WILLARD C. KRESS.